US006232682B1

(12) United States Patent
Hall

(10) Patent No.: US 6,232,682 B1
(45) Date of Patent: May 15, 2001

(54) GAS COOLED SOLID CONDUCTOR SERIES LOOP CAP ASSEMBLY

(75) Inventor: Chadlee Derek Hall, Saratoga Springs, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/438,029

(22) Filed: Nov. 10, 1999

(51) Int. Cl.[7] ........ H02K 9/00
(52) U.S. Cl. ........ 310/52; 29/590
(58) Field of Search ........ 310/52, 260, 270; 29/596

(56) References Cited

U.S. PATENT DOCUMENTS

| | | | | |
|---|---|---|---|---|
| 2,929,943 | * | 3/1960 | Richardson et al. | 310/64 |
| 3,010,038 | * | 11/1961 | Manni | 310/64 |
| 3,075,250 | * | 1/1963 | Strohm | 264/272.2 |
| 3,151,260 | * | 9/1964 | MacCracken et al. | 310/43 |
| 3,648,091 | * | 3/1972 | Kostin et al. | 310/260 |
| 3,978,359 | * | 8/1976 | Kultzow et al. | 310/260 |
| 4,385,254 | * | 5/1983 | Vakser et al. | 310/260 |
| 5,093,598 | * | 3/1992 | Fort | 310/215 |
| 5,142,182 | | 8/1992 | Grant | 310/270 |
| 5,633,543 | | 5/1997 | Jarczynski | 310/59 |
| 5,652,469 | | 7/1997 | Boardman et al. | 310/58 |
| 5,866,960 | * | 2/1999 | Meier et al. | 310/59 |
| 5,883,448 | | 3/1999 | Zimmerman | 310/52 |

* cited by examiner

*Primary Examiner*—Nestor Ramirez
*Assistant Examiner*—Joseph Waks
(74) *Attorney, Agent, or Firm*—Nixon & Vanderhye

(57) ABSTRACT

A cap for disposition on a series loop of a bar wound armature of an electrical system and having openings in side walls thereof for providing ventilation flow to the solid series loop. The conductor bars of the series loop define gas flow passages internally of the cap to allow forced convective cooling of the conductors and, thus, the electrical winding. In an exemplary embodiment, lips are extended from the openings to capture cooling flow and to concurrently extend electrical creepage distances from loop to loop.

18 Claims, 4 Drawing Sheets

108
106b
104a
84a
72a
52
62
54
58
72b
84b
106a
104b
110

28
A
26
16
30
50
48
32
10
18
36
22
12
40
34
20
24
38
14

108
104a
6
106b
66a
84a
68b
94
88b
74a
76b
72a
52
74b
76a
94
88a
106a
84b
68a
66b
104b
6
110

108
104a
106b
84a
72a
52
62

54
58
72b
84b
106a
104b
110

66
104
90
100
84
74
70

72
80
78
76
92
88
106
68
102

66
104

86
84
90
74
78
82
72
80
76
64
88
106
92

108
106b
104a 66a
84a
74a
76b
72b
78b
78a
72a
80a
80b
76a
74b
84b
88a
66b
106a
104b
110

GAS COOLED SOLID CONDUCTOR SERIES LOOP CAP ASSEMBLY

BACKGROUND OF THE INVENTION

The present invention relates to a cap for insulating series loop connections on bar wound armatures of electrical systems such as generators and, more particularly, to a cap assembly for providing series loop cooling and extended electrical creepage distances from loop to loop.

U.S. Pat. No. 5,633,543 and U.S. Pat. No. 5,652,469 describe ventilated cooling systems for rotating electrical machines, such as generators, which provide for end region cooling.

An exemplary reverse flow ventilation system of the type disclosed in U.S. Pat. No. 5,633,543, is illustrated by way of example in FIG. 1. More specifically, FIG. 1 shows a cross-section of one-half of a generator 10 (see axial centerline 12 and longitudinal center-line 14) having a conventional reverse flow ventilated cooling system. A portion 16 of the flow of cooling gases is directed to the rotor 18. The cooling gases are drawn through ventilation ducts 20 in the rotor by centrifugal forces created by the spinning rotor. As the gases flow through the rotor, heat in the rotor is transferred to the gases. The heated rotor gases exit the ducts 20 at the surface of the rotor into an air gap 22 between the rotor 18 and stator 24. Spinning fans 26 mounted at the ends of the rotor draw the heated gas through the gap 22 between the stator and rotor. The heated gas is directed by an external duct 28 to a heat exchanger 30 that cools the gas.

The stator 24 is cooled by ventilation flow paths that are separate from the flow path in the rotor. Cold gas 32 cooled by the heat exchanger 30 enters a plenum chamber 34 surrounding the stator 24. Because the end sections of the stator are closest to the rotor exhaust fans 26, cooling gas tends naturally to flow in greater volume near the ends of the stator than through ducts at the center of the stator. This potential unbalance in the flow of cooling gas through the stator has traditionally been compensated for by baffle chambers 36 that extend around outer surface 38 of the stator.

The cooled gas 32 passes through the baffle chambers 36 (or directly to the stator near the center of the stator) and into cooling gas intake ducts 40 defined between packets 42 of stator core laminations. As the gas flows radially inward through the stator, heat from the stator coils 44, 46 is transferred to the gas. The fans 26 draw the warmed gas from the stator, into the air gap 22 and out to the external duct 28 to the heat exchanger 30.

A portion of the cooled gas 32 from the heat exchanger 30 is exhausted from exhaust ports 48 in the ends of the plenum chamber 34 and flows around the stator to cool the stator end turns 50.

U.S. Pat. No. 5,142,182 describes an adjustable width cap for insulating the series loop on wound armatures in electrical systems. The molded cap is formed from two identical cap sections which are assembled to define a loop cap enclosure that is adjustable in width for receiving different sized series loops. To mechanically lock the cap sections to one another, potting resin is disposed within the cap section.

The provision of molded end caps as disclosed in U.S. Pat. No. 5,142,182 precludes the direct gas cooling of the solid series loops 50. Thus, heat generated thereby must be thermally conducted along a heat flow path from the electrical winding, through the molded cap to the cooling gas.

BRIEF SUMMARY OF THE INVENTION

The present invention is embodied in a modified cap assembly for providing ventilation to solid series loops, which concurrently extends electrical creepage distances from loop to loop. In an embodiment of the invention, the solid series loops are ventilated by providing ventilation openings in the side walls of the cap and a cooling gas flow path through the cap to allow forced convective cooling of the conductor and, thus, the electrical winding therewithin. More specifically, the invention is embodied in a cap for disposition on a series loop of a bar wound armature of an electrical system, that is formed by assembling a pair of cap sections. A cutout is defined in one or both side walls of one or both cap sections to provide at least one ventilation opening in each side wall of the assembled cap. In the presently preferred embodiment, the conductor bars of the series loop disposed within the cap are configured to define gas flow passage(s) between the ventilation openings.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 2:
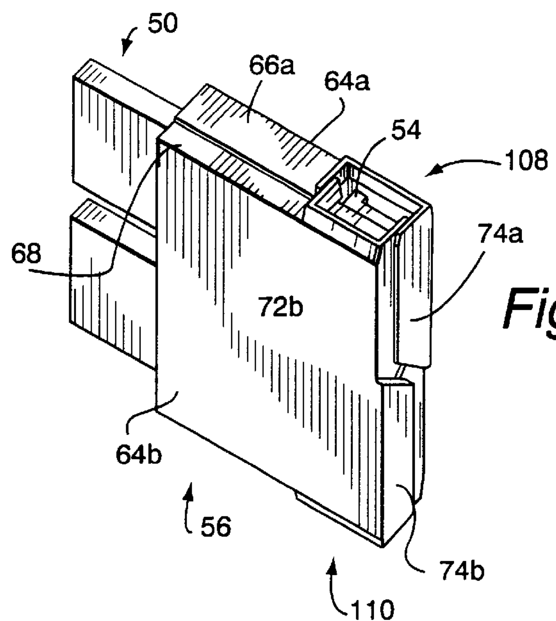
FIG. 2 is a perspective view of the region designated by detail A in FIG. 1, illustrating a cap applied to a series loop connection in an embodiment of the invention.
Figure 3:
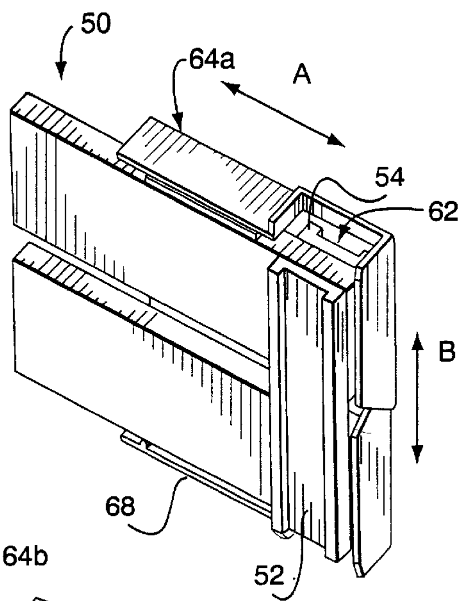
FIG. 3 is a perspective view similar to FIG. 1 with one cap section omitted to reveal the series loop configuration and interaction of the cap therewith.

Referring to FIGS. 2–3 there is illustrated a series loop or end turn 50 with a single-shot brazed connection. As illustrated, the conductor bars 52, 54 are formed in such a manner to define a gas ventilation flow passages. In the illustrated embodiment, each bar 52, 54 is generally U-shaped in cross-section so as to define, with the cap 56 mounted thereto, gas flow channels or passages, respectively generally shown at 58, 62. As an alternative to a U-shaped conductor bars, a simple bar conductor can be provided having one or more hollow passages defined longitudinally thereof for receiving and conducting cooling gas therethrough.

In the illustrated, presently preferred embodiment, cap 56 is formed of two identical or homomorphic cap sections assembled together to form essentially a five-sided enclosure having opposed side walls, an end wall, a pair of covers spaced one from the other and an opening opposite the end wall for receiving the series loop connection 50. For case of description of the assembly of the cap section, the letter notations (a) and (b) are used as suffixes to denote the parts of the first and second cap sections, respectively, in assembly. However, the description of the cap sections in general will omit such suffixes.

Figure 7:
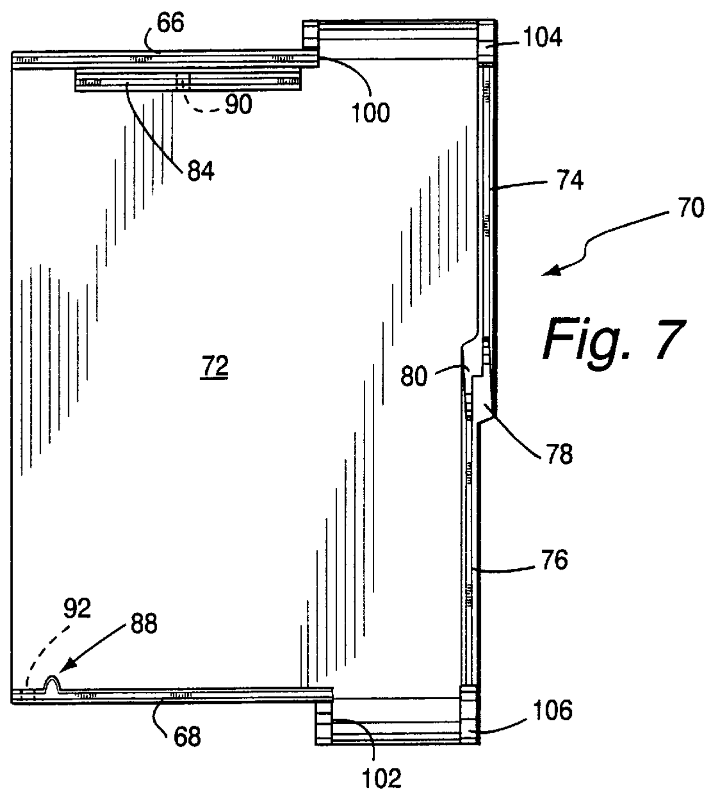
FIG. 7 is a side elevational view of a cap section, two of which cap sections form the caps illustrated in FIGS. 2 and 4.

Referring to FIG. 7, each cap section 64 includes a pair of spaced side walls, e.g., first and second side walls 66, 68, an end wall 70, and a cover 72 extending between side walls 66 and 68 and from end wall 70, leaving free, as illustrated in FIGS. 3 and 7, the margins of the side and end walls along the side of the cap section opposite the cover 72.

Figure 8:
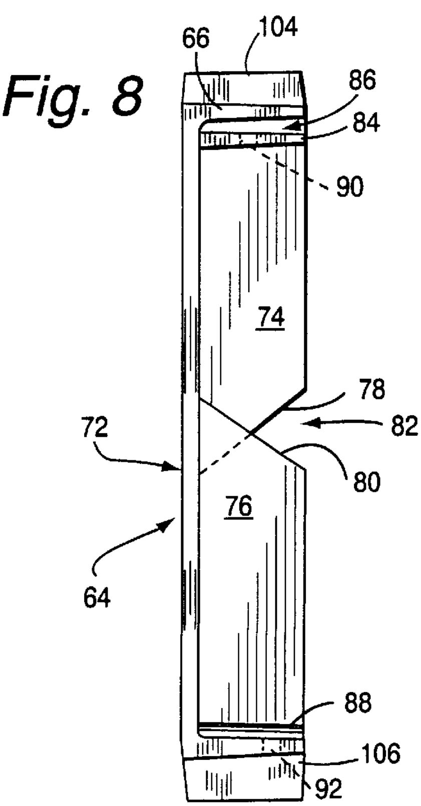
FIG. 8 is an end elevational view of a cap section taken from the left in FIG. 7.

End wall 70 is comprised of a pair of end wall segments, e.g., first and second end wall segments 74 and 76, respectively. End wall segments 74 and 76 extend generally parallel to one another but are offset in a longitudinal direction and in a radial direction one from the other. For purposes of this description, the longitudinal direction is in the direction of the arrow A in FIG. 3, whereas the radial direction extends in the direction of the arrow B, i.e., from one side wall to another. Longitudinally offset end wall segments 74 and 76 have radial end edges 78 and 80, respectively, which extend from the free margins of the end wall segments inwardly toward the cover 72. Edges 78 and 80 are also inclined toward one another to define an inset portion or opening 82 at least equal to about one-half of the transverse dimension of the end wall 70, as illustrated in FIG. 8. Thus, edges 78 and 80 lie longitudinally and radially offset one from the other. Additionally, edges 78 and 80 and inset portion 82 defined thereby lie substantially medially of the length of end wall 70, for reasons which will become apparent from the ensuing description. It will be appreciated, however, that inset portions defined by inclined edges such as edges 78 and 80 may be located at spaced locations along end wall 70, rather than medially as illustrated, provided such edges can intermesh one with the other when the cap sections 64*a*, 64*b* are assembled, as set forth hereinbelow. The opposite end of cap section 64, the left end as shown in FIG. 7, is defined by the free end edges of side walls 66, 68 and the free end edge of cover 72.

As best illustrated in FIGS. 7 and 8, a longitudinally extending tab 84 is disposed adjacent first side wall 66 in generally parallel relation therewith and extends from a location adjacent cutout 100 (discussed hereinbelow) to a location approaching the free end edge of the cap section 64. Tab 84 thus defines a slot 86 with side wall portion 66 in juxtaposition therewith for receiving, in assembly, a portion of the opposite second side wall 68 of another cap section 64, as detailed below. Tab 84 extends from the cover 72 and is preferably of the same depth as side wall 66. Tab 84 may, however, be secured to side wall 68 adjacent cover 72 and does not necessarily require securement to cover 72. Along the opposite side wall 68, there is provided a rib 88. Rib 88 is disposed at a longitudinal location along side wall 68 beyond the tab 84.

To assist in securing cap sections 64*a* and 64*b* one to the other in assembly, an opening 90 is formed through tab 84. A similar opening 92 is formed through the second side wall 68 adjacent its distal end. More particularly, to lock the cap section in assembled relation one with the other, a potting resin 94 may be disposed in the cap sections, and will flow into the openings 90 and 92. When the resin is cured, the potting resin will thus form locking pins.

It will be appreciated that, with the foregoing construction of the cap sections, each cap section may be formed of a dielectric material, for example, a resin, formed in a single mold whereby an assembly of a pair of such homomorphic or identical cap sections may form the cap for receiving the series loop connection.

To assemble a pair of cap sections 64 to form cap 56, the side walls and end wall segments are respectively intermeshed whereby the cap sections, in final assembly, are radially offset one from the other a distance corresponding substantially to the thickness of a side wall. The cap sections 64 are, however, longitudinally aligned one with the other. This radial offset can be seen in FIG. 2, wherein the first side wall 66*a* and a first end wall segment 74*a* of a first cap section 64*a* are illustrated, whereas the cover 72*b*, the first end wall segment 74*b* and second side wall 68*b* of a second cap section 64*b* are illustrated.

Figure 5:
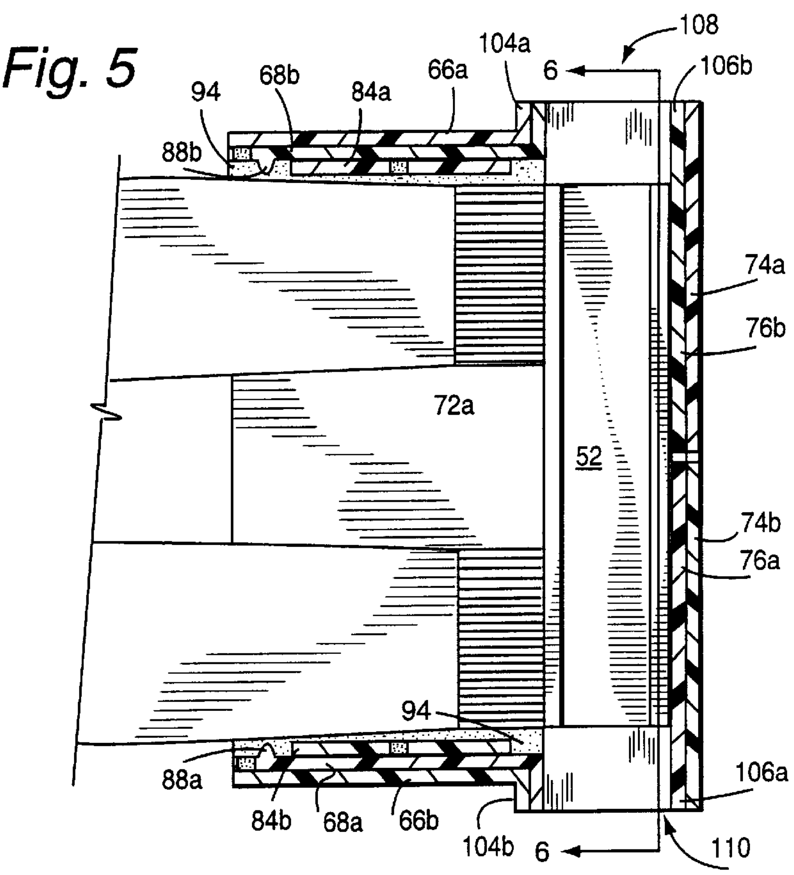
FIG. 5 is an enlarged cross-sectional view of a series loop connection with cap applied thereto.
Figure 6:
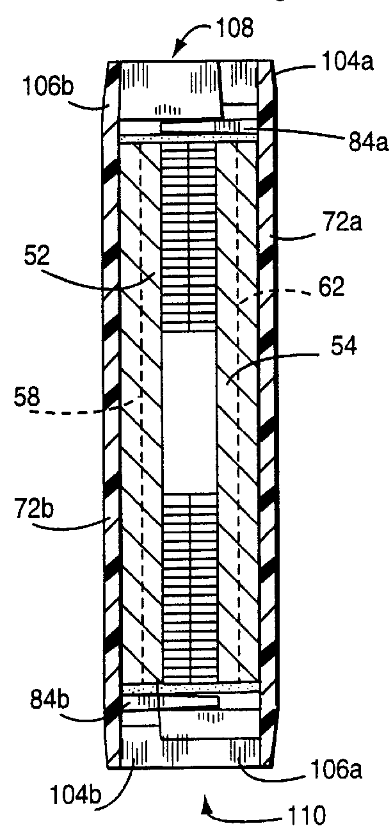
FIG. 6 is a cross-sectional view taken along line 6—6 of FIG. 5.

Referring to FIG. 5, when identical cap sections 64 are intermeshed one with the other, side walls 66*a* and 68*a* of cap section 64*a* lie in generally parallel juxtaposition with the respective side walls 68*b* and 66*b*, respectively, of the second cap section 64*b*. First side wall 66*a* of the first cap section 64*a* lies outwardly of side wall 68*b* of second cap section 64*b*. Likewise, the first side wall 66*b* of second cap section 64*b* lies outwardly of second wall 68*a* of first cap section 64*a*. Note also that a portion of side wall 68*b* of second cap section 64*b* lies between tab 84*a* and side wall 66*a* of first cap section 64*a* and inwardly of rib 88*b* of second cap section 64*b*. Similarly, a portion of side wall 68*a* of first cap section 64*a* lies between tab 84*b* and side wall 66*b* of second cap section 64*b* and inwardly of rib 88*b*.

Figure 4:
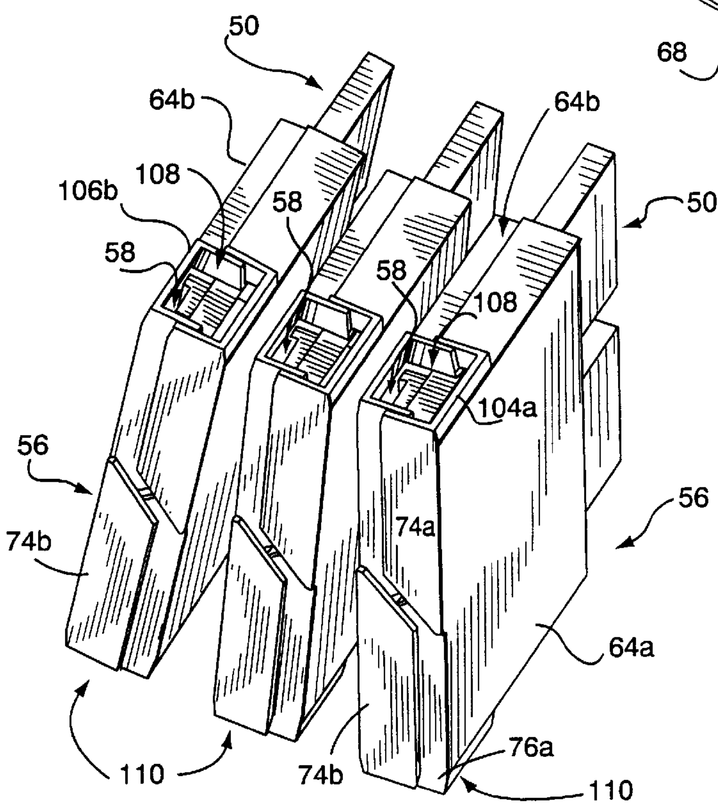
FIG. 4 is a perspective view of a plurality of circumferentially adjacent series loops with end caps applied thereto.
Figure 9:
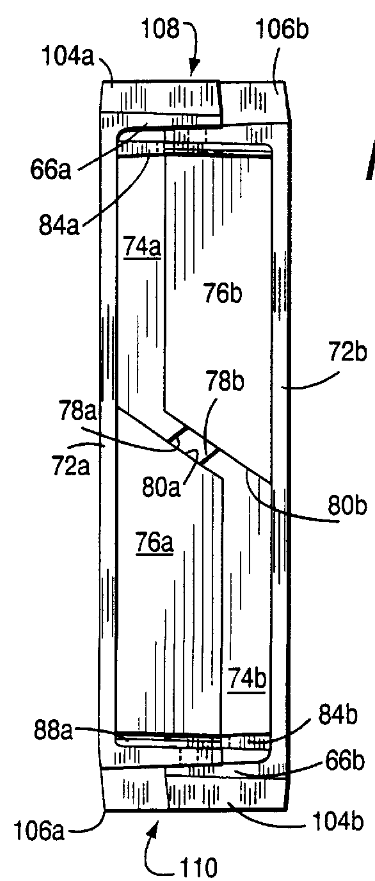
FIG. 9 is an end elevational view of the cap formed by assembling the cap sections to define a cap.

A review of FIGS. 2, 4, and 5 also reveals that first and second end wall segments 74*a* and 76*a* of the first cap section 64*a* lie in side-by-side parallel relation with respective second and first end wall segments 76*b* and 74*b* of second cap section 64*b*. It will also be appreciated from a review of FIG. 5 that the insert edges of the end wall segments 78*a* and 80*a* of the cap section 64*a* respectively intermesh with the inset edges of the end wall segments 78*b* and 80*b* of the cap section 64*b*. Thus, the cap sections are radially offset one from the other, as illustrated in FIG. 5, but are longitudinally aligned one with the other. The inset edges 78 and 80 accommodate the longitudinal alignment and radial offset. It will also be appreciated from a review of FIGS. 4 and 9 that the cap sections may be assembled to a selected width (transverse dimension), depending upon the degree to which the sections are intermeshed.

Each cap section 64 further includes cutouts 100, 102 and part surrounding extended lips 104, 106 projecting generally radially from each side wall 66, 68 thereof so that when the cap sections 64*a* and 64*b* are assembled to define the cap, a ventilation or cooling flow opening 108 is defined by extended lips 104*a* and 106*b* and a ventilation or cooling flow opening 110 is defined by extended lips 104*b* and 106*a*, on radially opposite sides of the cap 56. As can be seen, the lips of the cutouts respectively defining of the ventilation openings have a complementary configuration so as to nest to define a substantially continuous peripheral lip of the respective ventilation opening.

Figure 1:
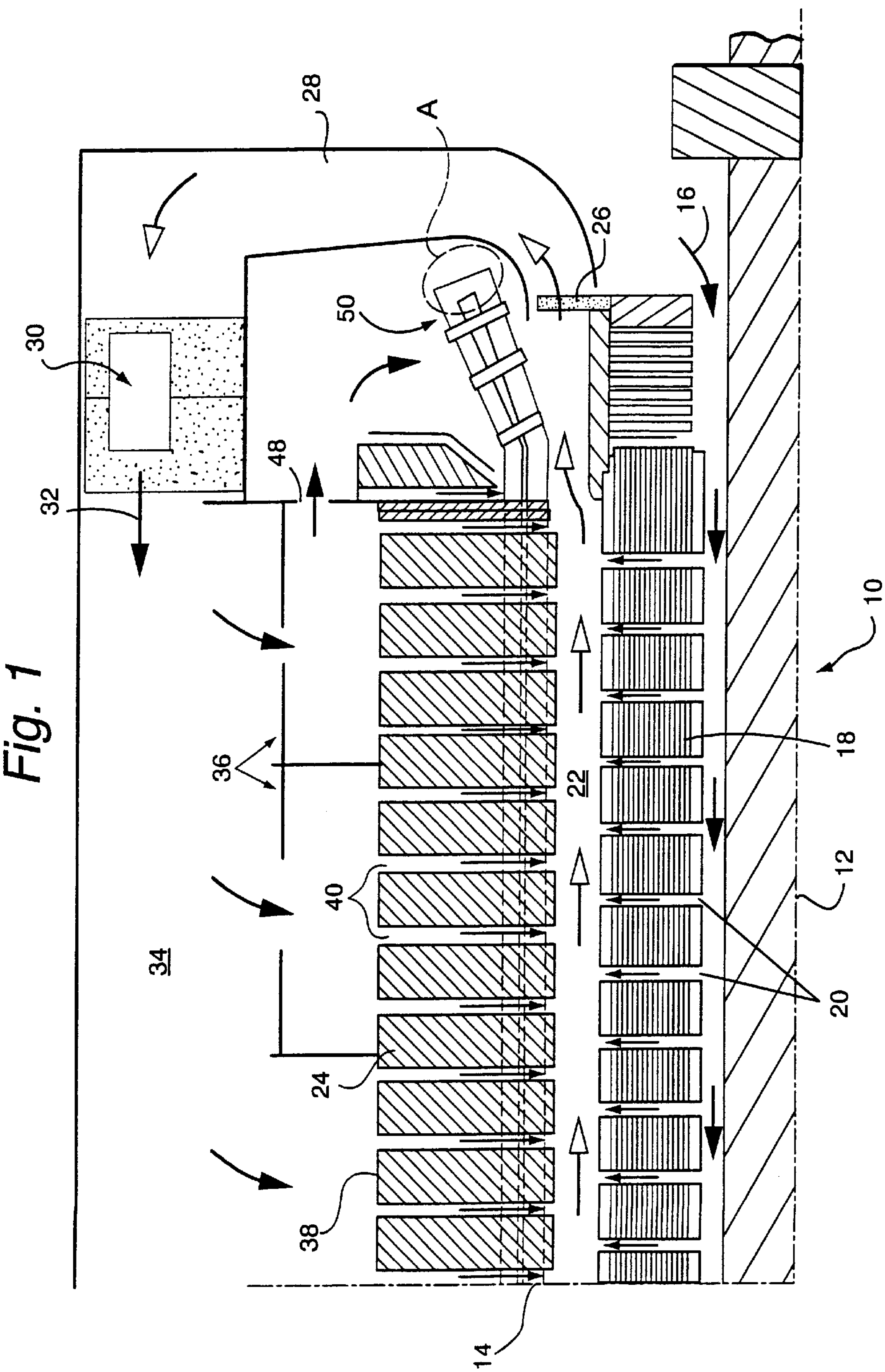
FIG. 1 is a schematic cross-sectional diagram of a generator showing a reverse flow cooling system.

As mentioned above, the conductor bars 52, 54 are formed in such a manner as to define a gas ventilation flow passages. In the illustrated embodiment, each bar 52, 54 is generally U-shaped in cross-section so as to define, with the cap 56 mounted thereto, air flow channels 58, 62. As an alternative to U-shaped conductor bars, a simple bar conductor can be provided having one or more hollow passages defined therethrough for receiving and conducting cooling gas therethrough. Thus, as shown in FIG. 1, a portion of the cooling air flow directed towards the series loops, circumferentially disposed as shown in FIG. 4, can flow into radially outer ventilation opening 110 and into and through cooling passages 58, 62 to directly cool the conductors 52, 54. The warmed gas can then exit through radially inner ventilation opening 108 to join the warmed gas flowing out from gap 22.

The extended lips 104, 106 on the cap 56 provide two functions in the preferred embodiment of the invention. First, they increase the electrical creepage distance from series loop to series loop. This allows the series loops to be effectively insulated from each other while still providing a ventilation passage for cooling gas. Second, the lips may be angled so as to optimize the amount of cooling gas captured from the ventilation flow field. The angle is dependent upon the type and direction of cooling gas and the orientation of the series loop, and thus the end cap, with respect thereto. In the event the lips are to be angled in opposite directions at each radial side of the cap, for example, towards the plane of the end wall at the radially outer side and towards the open end of the cap at the radially inner side of the cap then the radially upper and radially lower halves of the caps will be non-symmetrical, so that each cap section is not identical. Where the extruded lips 104, 106 project symmetrically at each radial side of the cap, then the halves may be made from the same mold.

In the illustrated embodiment the extended cap lips are angled circumferentially inwardly, away from adjacent caps. This is to allow for the extension without decreasing the amount of circumferential space left in between adjacent series loop assemblies.

To preclude the possibility of the open conductors 52, 54 causing problems during operational malfunctions, the strap and bar assembly may be coated with a non-conducting paint. This will circumvent any possibility of the gas ionizing under extreme conditions and yet allow the forced convection cooling of the loops as aforesaid.

The gas ventilation flow paths 58, 62 defined by the bars 52, 54 and the cap sections *64a* and *64b* must be maintained patent. Thus, no cap filler may be allowed to intrude substantially into the gas passage. This may be accomplished either by adding ridges to the cap to compartmentalize and thus contain the applied filler or by clearing the gas passages immediately after assembly and filling with potting.

It will be appreciated that the cap sections 64 may be assembled directly onto the series loop connection 50. Thus, the cap sections may be disposed on opposite sides of a series loop and pressed toward one another, with the side walls and the end wall segments intermeshing with one another, respectively, as previously described. Alternatively, the cap sections may be disposed about the end loop in a clamshell-type manner. Of course, additional securing means may be desirable and may comprise, e.g., banding tapes disposed about the cap sections when assembled.

While the invention has been described with reference to the preferred embodiment wherein the cap sections are identical or nearly identical such that a cutout, such as a hole or slot, is defined in each side wall of each cap section, to be aligned with one another to define the ventilation openings 108, 110 in the cap 56, in the alternative, a cutout may be provided in each side wall of only one of the cap sections, a cutout may be provided in one side wall of each cap section (so as to be disposed on opposite sides of the assembled cap structure), or independent cutouts or openings may be provided in each cap section, particularly where sidewall overlap is limited. These and other alternatives will be readily understood by the skilled artisan. Thus, while the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A cap in combination with a series loop of a bar wound armature of an electrical system, the cap comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respectively, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

said first and second side walls of at least one of said cap sections having a cutout defined therein so that when said first and second cap sections are assembled said cutouts of said side walls define first and second ventilation openings in the cap, and wherein said series loop includes first and second conductor bars, said first conductor bar extending generally between said side walls of said first cap section and said second conductor bar extending generally between said side walls of said second cap section, at least one of said conductor bars defining at least one gas passage therealong whereby at least one cooling air flow path is defined through said cap substantially from said one ventilation opening to the other along said gas passage defined by said conductor bar.

2. A cap according to claim 1, further comprising a lip extending from a periphery of each said cutout.

3. A cap according to claim 1, wherein said at least one conductor bar is generally U-shaped in cross-section to thereby define said gas passage therealong.

4. A cap according to claim 1, wherein said first and second cap sections are assembled to form the cap with (i) the first and second side walls of said first cap section lying generally parallel and side-by-side with the respective second and first side walls of said second cap section, and (ii) the end wall of said first cap section lying in side-by-side generally parallel relation with the end wall of said second cap section.

5. A cap according to claim 4, wherein a cutout is defined in said first and second side walls of each said cap section so that when said first and second cap sections are assembled said cutout of said first side wall of said first cap section and said cutout of said second side wall of said second cap section together define said first ventilation opening and said cutout of said second side wall of said first cap section and said cutout of said first side wall of said second cap section together define said second ventilation opening.

6. A cap according to claim 5, wherein said lips of said cutouts respectively defining said ventilation openings of said assembled cap sections have a complementary configuration so as to define a substantially continuous peripheral lip of said respective ventilation opening.

7. A cap according to claim 1, wherein each said cap section includes a tab spaced closely adjacent one of said side walls to define a slot therewith for receiving the opposite side wall of the other cap section when said cap sections are assembled one with the other.

8. A cap according to claim 7, including a rib projecting inwardly from said opposite side wall of each cap section, each said rib being spaced from said end wall of said cap section to enable disposition of the tab of the other cap section between said rib and said end wall.

9. A cap for disposition on a series loop of a bar wound armature of an electrical system, comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respectively, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

said first and second side walls of at least one of said cap sections having a cutout defined therein so that when said first and second cap sections are assembled said cutouts of said side walls define first and second ventilation openings in the cap, wherein said first and second cap sections are assembled to form the cap with (i) the first and second side walls of said first cap section lying generally parallel and side-by-side with the respective second and first side walls of said second cap section, and (ii) the end wall of said first cap section lying in side-by-side generally parallel relation with the end wall of said second cap section and, wherein each said end wall has first and second generally parallel segments that are longitudinally offset and laterally spaced one from the other, said first and second segments have longitudinal end edges thereof inset from the free margin of said end wall at a location therealong intermediate said side walls; and the inset edges of said first and second segments of said first cap section and the inset edges of the first and second segments of said second cap section enabling the respective side walls of the first and second cap sections and the respective end wall segments thereof to intermesh and thereby form the cap.

10. A cap for disposition on a series loop of a bar wound armature of an electrical system, comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respectively, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

said first and second side walls of at least one of said cap sections having a cutout defined therein so that when said first and second cap sections are assembled said cutouts of said side walls define first and second ventilation openings in the cap, wherein the edges of said first and second cap segments are laterally shifted selectively one from the other upon assembly to enable the cap sections to form a cap having selected widths between the opposed covers.

11. A cap in combination with a series loop of a bar wound armature of an electrical system in the cap, comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respectively, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

at least one said side wall of each said cap section having a cutout defined therein so that when said first and second cap sections are assembled said cutouts in said side walls define first and second ventilation openings in the cap, and wherein the series loop includes first and second conductor bars, said first conductor bar extending generally between said side walls of said first cap section and said second conductor bar extending generally between said side walls of said second cap section, at least one of said conductor bars defining at least one gas passage therealong whereby at least one cooling air flow path is defined through said cap substantially from said one ventilation opening to the other alone said gas passage defined by said conductor bar.

12. A cap according to claim 11, further comprising a lip extending from a periphery of each said cutout.

13. A cap according to claim 11, wherein said at least one conductor bar is generally U-shaped in cross-section to thereby define said gas passage therealong.

14. A cap according to claim 11, wherein said first and second cap sections are assembled to form the cap with (i) the first and second side walls of said first cap section lying generally parallel and side-by-side with the respective second and first side walls of said second cap section, and (ii) the end wall of said first cap section lying in side-by-side generally parallel relation with the end wall of said second cap section.

15. A cap according to claim 11, wherein each said cap section includes a tab spaced closely adjacent one of said side walls to define a slot therewith for receiving the opposite side wall of the other cap section when said cap sections are assembled one with the other.

16. A cap according to claim 15, including a rib projecting inwardly from said opposite side wall of each cap section, each said rib being spaced from said end wall of said cap section to enable disposition of the tab of the other cap section between said rib and said end wall.

17. A cap for disposition on a series loop of a bar wound armature of an electrical system, comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respectively, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

at least one said side wall of each said cap section having a cutout defined therein so that when said first and second cap sections are assembled said cutouts in said side walls define first and second ventilation openings in the cap, wherein each said end wall has first and second generally parallel segments that are longitudinally offset and laterally spaced one from the other, said first and second segments have longitudinal end edges thereof inset from the free margin of said end wall at a location therealong intermediate said side walls; and the inset edges of said first and second segments of said first cap section and the inset edges of the first and second segments of said second cap section enabling the respective side walls of the first and second cap sections and the respective end wall segments thereof to intermesh and thereby form the cap.

18. A cap for disposition on a series loop of a bar wound armature of an electrical system, comprising:

first and second cap sections, each of said cap sections having (i) first and second opposed generally parallel longitudinally extending side walls, (ii) an end wall extending generally between said side walls adjacent one end of said cap section and (iii) a cover extending between said side walls and from said end wall along said cap section leaving free edges of said side and end walls remote from said cover;

said first and second cap sections being assembled to form the cap with the first and second side walls of said first cap section disposed adjacent the second and first side walls of said second cap section, respective, (ii) the end wall of said first cap section disposed adjacent the end wall of said second cap section, and (iii) the covers of said first and second cap sections spaced one from the other whereby said covers, said side walls and said end walls of said first and second cap sections together define an enclosure open at an end thereof opposite said end walls for receiving the series loop of the bar wound armature;

at least one said side wall of each said cap section having a cutout defined therein so that when said first and second cap sections are assembled said cutouts in said side walls define first and second ventilation openings in the cap, wherein the edges of said first and second cap segments are laterally shifted selectively one from the other upon assembly to enable the cap sections to form a cap having selected widths between the opposed covers.

* * * * *